United States Patent
Ryu et al.

(10) Patent No.: US 8,778,523 B2
(45) Date of Patent: *Jul. 15, 2014

(54) MULTI-LAYERED TYPE ELECTROCHEMISTRY CELL OF IMPROVED SAFETY

(71) Applicant: LG Chem, Ltd., Seoul (KR)

(72) Inventors: Ji Heon Ryu, Seoul (KR); Jaepil Lee, Daejeon (KR); Jeong Hee Choi, Busan (KR); Min Su Kim, Daejeon (KR); Youngjoon Shin, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/911,480

(22) Filed: Jun. 6, 2013

(65) Prior Publication Data

US 2013/0266841 A1   Oct. 10, 2013

Related U.S. Application Data

(63) Continuation of application No. 11/673,844, filed on Feb. 12, 2007, now Pat. No. 8,481,196.

(30) Foreign Application Priority Data

Mar. 14, 2006   (KR) .................. 10-2006-0023727

(51) Int. Cl.
*H01M 2/18*   (2006.01)

(52) U.S. Cl.
USPC ........................................................ 429/139

(58) Field of Classification Search
None
See application file for complete search history.

(56) References Cited

U.S. PATENT DOCUMENTS

| | | |
|---|---|---|
| 3,207,630 A | 9/1965 | Solomon et al. |
| 4,368,243 A | 1/1983 | O'Rell et al. |
| 5,605,771 A | 2/1997 | Eidler et al. |
| 6,296,971 B1 | 10/2001 | Hara |
| 6,709,785 B2 | 3/2004 | Lee et al. |
| 6,726,733 B2 | 4/2004 | Lee et al. |
| 2002/0160257 A1 | 10/2002 | Lee et al. |
| 2002/0160258 A1 | 10/2002 | Lee et al. |
| 2003/0148174 A1 | 8/2003 | Gu |
| 2004/0029001 A1 | 2/2004 | Yamazaki et al. |
| 2005/0084750 A1 | 4/2005 | Wang et al. |
| 2005/0233190 A1 | 10/2005 | Finkelshtain et al. |

FOREIGN PATENT DOCUMENTS

| | | |
|---|---|---|
| JP | 1993-174863 | 7/1993 |
| KR | 2001-0082058 A | 8/2001 |
| KR | 2001-0082059 A | 8/2001 |
| KR | 2001-0082060 A | 8/2001 |
| KR | 20050066652 A | 6/2005 |
| TW | 454360 B | 9/2001 |
| TW | 485657 | 5/2002 |

*Primary Examiner* — Melvin C Mayes
*Assistant Examiner* — Stefanie Cohen
(74) *Attorney, Agent, or Firm* — Lerner, David, Littenberg, Krumholz & Mentlik, LLP

(57) ABSTRACT

Disclosed herein is an electrochemical cell constructed in a structure in which a plurality of full cells or bicells, as unit cells, are folded by a separation film formed in the shape of a long sheet, and separators of the unit cells are secured to the separation film by thermal welding. The electrochemical cell according to the present invention has the effect of preventing the electrodes of the stacked electrodes from being separated from the separation film or from being twisted due to external impacts and vibrations, thereby restraining the electrochemical cell from generating heat or catching fire. Furthermore, the structural stability of the electrochemical cell is maintained even when the temperature of the electrochemical cell is increased, or the volume of the electrochemical cell is increased due to the generation of gas.

13 Claims, 4 Drawing Sheets

MULTI-LAYERED TYPE ELECTROCHEMISTRY CELL OF IMPROVED SAFETY

CROSS-REFERENCE TO RELATED APPLICATIONS

The present application is a continuation of U.S. patent application Ser. No. 11/673,844, filed Feb. 12, 2007, now U.S. Pat. No. 8,481,196, which claims priority from Korean Application No. 10-2006-0023727 filed Mar. 14, 2006, the disclosures of which are hereby incorporated herein by reference.

FIELD OF THE INVENTION

The present invention relates to a multi-layered type electrochemical cell having improved safety, and, more particularly, to an electrochemical cell constructed in a structure in which a plurality of full cells or bicells, as unit cells, are folded by a separation film formed in the shape of a long sheet, and separators of the unit cells are secured to the separation film by thermal welding.

BACKGROUND OF THE INVENTION

As mobile devices have been increasingly developed, and the demand of such mobile devices has increased, the demand of secondary batteries has also sharply increased. Among them is a lithium secondary battery having high energy density and voltage and excellent preservation and service-life characteristics, which has been widely used as an energy source for various electronic products as well as the mobile devices.

Based on their external and internal structures, the secondary batteries are generally classified into a cylindrical battery, a prismatic battery, and a pouch-shaped battery. Especially, the prismatic battery and the pouch-shaped battery, which can be stacked with high integration and have a small width to length ratio, have attracted considerable attention.

An electrochemical cell having a cathode/separator/anode structure, which constitutes a secondary battery, may be generally classified as a jelly-roll (winding) type electrochemical cell or a stacking type electrochemical cell based on the structure of the electrochemical cell. The jelly-roll type electrochemical cell is manufactured by coating a metal foil to be used as a current collector with an electrode active material, drying and pressing the coated metal foil, cutting the dried and pressed metal foil into the form of a band having a predetermined width and length, isolating an anode and a cathode from each other using a separator, and helically winding the anode/separator/cathode structure. The jelly-roll type electrochemical cell is suitable for cylindrical batteries; however, the jelly-roll type electrochemical cell is not suitable for prismatic batteries or pouch-shaped batteries because the electrode active material may be detached, and the spatial utilizability is low. On the other hand, the stacking type electrochemical cell is an electrochemical cell constructed in a structure in which a plurality of cathode and anode unit cells are sequentially stacked one on another. The stacking type electrochemical cell has an advantage in that the stacking type electrochemical cell can be constructed in a prismatic structure; however, the stacking type electrochemical cell has disadvantages in that a process for manufacturing the stacking type electrochemical cell is complicated and troublesome, and, when external impacts are applied to the stacking type electrochemical cell, electrodes of the stacking type electrochemical cell are pushed with the result that short circuits occur in the stacking type electrochemical cell.

In order to solve the above-described problems, there has been developed an electrochemical cell having a novel structure, which is a combination of the jelly-roll type electrochemical cell and the stacking type electrochemical cell, i.e., an electrochemical cell constructed in a structure in which full cells having a cathode/separator/anode structure of a predetermined unit size or bicells having a cathode (anode)/separator/anode (cathode)/separator/cathode (anode) structure of a predetermined unit size are folded using a long continuous separation film. Examples of such an electrochemical cell are disclosed in Korean Unexamined Patent Publication No. 2001-82058, No. 2001-82059, and No. 2001-82060, which have been filed in the name of the applicant of the present patent application.

In the electrochemical cell having the above-described structure, however, the long separation film is used with the result that the electrodes of the unit cells may be separated from the separation film or the electrodes of the unit cells may be twisted due to impacts and vibrations applied to the outside and the inside of the battery, which may cause the occurrence of short circuits in the secondary battery. According to circumstances, the secondary battery may catch fire or explode.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that, when separators of a plurality of unit cells folded by a separation film formed in the shape of a long sheet are secured to the separation film by thermal welding, the electrodes of the stacked electrodes are prevented from being separated from the separation film or from being twisted due to external impacts and vibrations, whereby the electrochemical cell is restrained from generating heat or catching fire, and the structural stability of the electrochemical cell is maintained even when the temperature of the electrochemical cell is increased, or the volume of the electrochemical cell is increased due to the generation of gas. The present invention has been completed based on these findings.

In accordance with one aspect of the present invention, the above and other objects can be accomplished by the provision of a multi-layered type electrochemical cell constructed in a structure in which a plurality of full cells or bicells, as unit cells, are folded by a separation film formed in the shape of a long sheet, and separators of the unit cells are secured to the separation film by thermal welding.

In a preferred embodiment, the electrochemical cell is constructed in a structure in which the separation film has a unit length sufficient to wrap the unit cells, and the separation film is bent inward every unit length, whereby the separation film continuously wraps the unit cells from the central unit cell to the outermost unit cells.

Specifically, the electrochemical cell is constructed in a structure in which the separation film wraps the outer surface of a first central unit cell from one end thereof by a turn, the separation film wraps the outer surfaces of a second unit cell and a third unit cell by a turn while the second unit cell and the third unit cell are positioned above and below the first unit cell, respectively, such that the unit cells can be stacked one on another while the separation film is disposed between the unit cells, and the separation film wraps the outer surfaces of a fourth unit cell and a fifth unit cell by a turn while the fourth unit cell and the fifth unit cell are positioned above the second unit cell and below the third unit cell, respectively, i.e., in a structure in which the outermost unit cells can be wrapped by the separation film.

This electrochemical cell may be manufactured, for example, by fixing the first unit cell to one major surface of the separation film at one end of the separation film using a thermal welding method, fixing the second unit cell to one major surface of the separation film in the condition that the thickness and width of the first unit cell and the thickness of the second unit cell stacked on the first unit cell are set to a unit length, and fixing the third unit cell to one major surface of the separation film in the condition that the thicknesses of the first and second unit cells and the thickness of the third unit cell fixed to the first and second unit cells are set to a unit length, i.e., by bending the separation film inward every unit length while the unit cells are fixed to one major surface of the separation film in the condition that the unit length is defined by the sum of the thickness of the fixed unit cell(s) and the thickness of the unit cells to be fixed. At this time, the unit length between the first unit cell and the second unit cell is a length including the thickness and width of the first unit cell, which is different from the unit lengths between the other unit cells.

In another preferred embodiment, the electrochemical cell is constructed in a structure in which the separation film has a unit length sufficient to wrap the unit cells, and the separation film is bent outward every unit length, whereby the separation film continuously wraps the unit cells from the lowermost unit cell to the upper most unit cell in a zigzag fashion, and the remainder of the separation film wraps the outer circumference of the stacked cells.

This electrochemical cell may be manufactured, for example, by fixing the first unit cell to one major surface of the separation film at one end of the separation film using a thermal welding method, fixing the second unit cell to the other major surface of the separation film, which is opposite to the first unit cell, in the condition that the thickness of the unit cell is set to a unit length, i.e., by bending the separation film outward every unit length while the unit cells are alternately fixed to the opposite major surfaces of the separation film in the condition that the unit length is defined by the thickness of the unit cell.

In the present invention, the terms "inward" and "outward" indicate directions in which the separation film is bent. When the separation film is bent in the same direction as the direction in which the separation film has been previously bent, the direction is expressed by the term "inward." When the separation film is bent in the opposite direction to the direction in which the separation film has been previously bent, on the other hand, the direction is expressed by the term "outward." For example, when the direction in which the separation film has been previously bent is the right direction, the same direction, i.e., the right direction, is expressed by the term "inward," and the opposite direction, i.e., the left direction, is expressed by the term "outward."

Preferably, the thermal welding is performed at one side or opposite sides of each unit cell. Alternatively, the thermal welding may be performed at a lower end and/or an upper end of each unit cell. When each unit cell is provided at the upper end thereof with electrode terminals, on the other hand, the thermal welding may be performed at the lower end of each unit cell.

In a preferred embodiment, when the thermal welding is performed at the lower end and/or the upper end of each cell, a separator having a size sufficient to completely cover the lower end and/or the upper end of each cell is attached to the lower end and/or the upper end of each cell, and the thermal welding is performed at the lower end and/or the upper end of each cell.

The thermal welding is performed at the separation film and the separators, which have low heat resistance. Consequently, it is preferable to perform the thermal welding at a temperature of 70 to 140° C. When the temperature is too low, time necessary for the thermal welding is increased, and it is necessary to apply high pressure in addition to heat. Consequently, the low temperature is not desirable in a process for manufacturing a battery. When the temperature is too high, on the other hand, the separation film or the separators are damaged, when the thermal welding is performed, with the result that internal short circuits may occur or electrode active materials may be damaged. Consequently, the high temperature is not desirable.

The construction of the full cells and the bicells which are used in the present invention and a method of constructing an electrochemical cell using the full cells and the bicells are fully disclosed in Korean Unexamined Patent Publication No. 2001-82058, No. 2001-82059, and No. 2001-82060, which have been filed in the name of the applicant of the present patent application. The disclosures of the above-mentioned patent publications are hereby incorporated by reference as if fully set forth herein.

A full cell, which is used as a unit cell, is a cell constructed in a cathode/separator/anode unit structure. Specifically, the full cell is a cell having a cathode and an anode positioned at the opposite sides thereof, respectively. The basic structure of the full cell may be either a cathode/separator/anode structure or a cathode/separator/anode/separator/cathode/separator/anode structure. A full cell having the cathode/separator/anode structure is shown in a typical view of FIG. 1. In order to construct an electrochemical cell including secondary batteries using the full cell, it is necessary to stack a plurality of full cells one on another, such that the cathodes and the anodes face each other, while a separation film is disposed between the full cells.

On the other hand, a bicell, which is used as a unit cell, is a cell constructed in either a cathode/separator/anode/separator/cathode unit structure or an anode/separator/cathode/separator/anode unit structure. That is, the bicell is a cell having identical electrodes positioned at the opposite sides thereof. A bicell having the cathode/separator/anode/separator/cathode structure is shown in a typical view of FIG. 2, and a bicell having the anode/separator/cathode/separator/anode structure is shown in a typical view of FIG. 3. In order to construct an electrochemical cell including secondary batteries using the bicell, it is necessary to stack a plurality of bicells one on another, such that the bicells having the cathode/separator/anode/separator/cathode structure and the bicells having anode/separator/cathode/separator/anode structure face each other, while a separation film is disposed between the bicells.

According to circumstances, the bicells may be further stacked. Examples of the further stacked bicells are illustrated in FIGS. 4 and 5. Specifically, a bicell having a cathode/separator/anode/separator/cathode/separator/anode/separator/cathode structure is shown in a typical view of FIG. 4, and a bicell having an anode/separator/cathode/separator/anode/separator/cathode/separator/anode structure is shown in a typical view of FIG. 5.

In accordance with another aspect of the present invention, there is provided a lithium secondary battery including the above-described electrochemical cell.

Components of the lithium secondary battery and a method of manufacturing the lithium secondary battery are well known in the art to which the present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
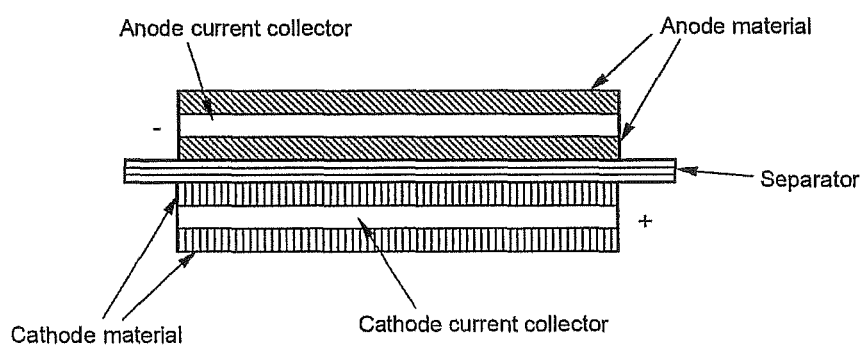
FIGS. 1 to 5 are typical views respectively illustrating an exemplary full cell and bicells that can be used as a unit cell of an electrochemical cell according to the present invention.
Figure 2:
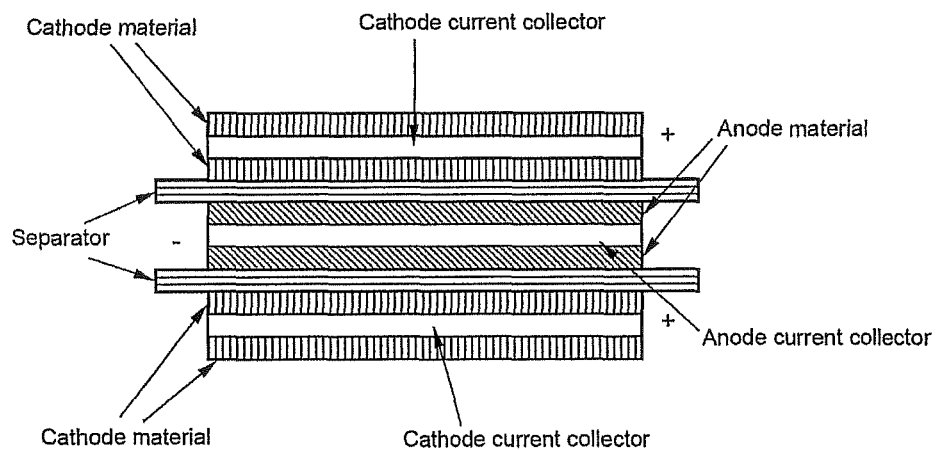
Figure 3:
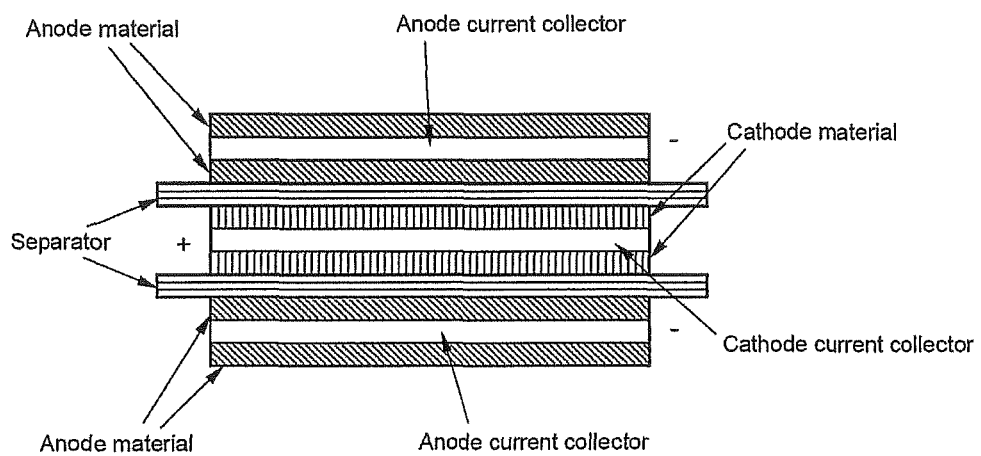
Figure 4:
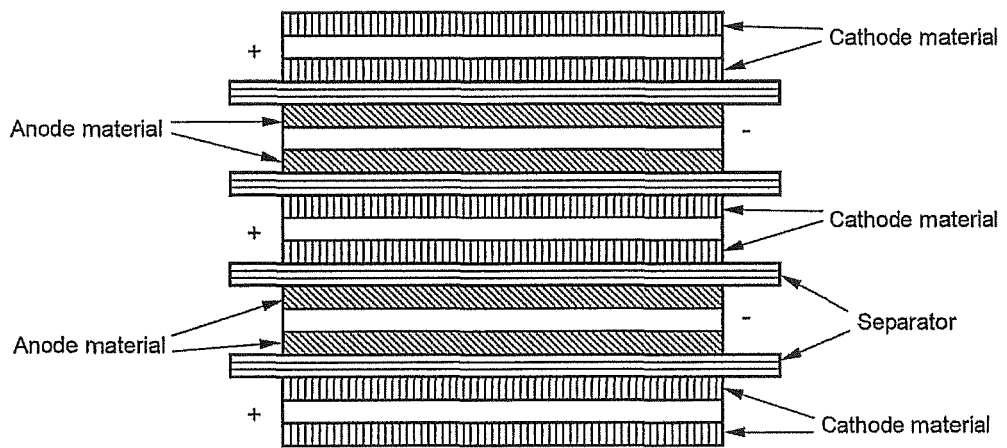
Figure 5:
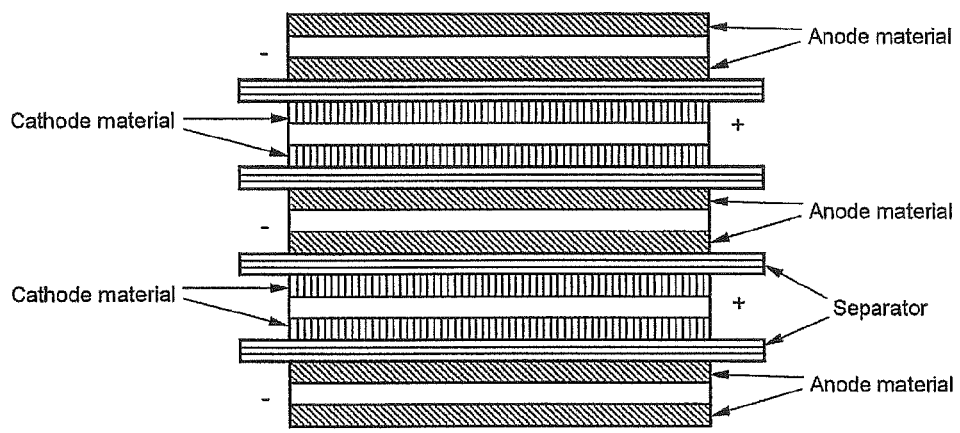
Figure 6:
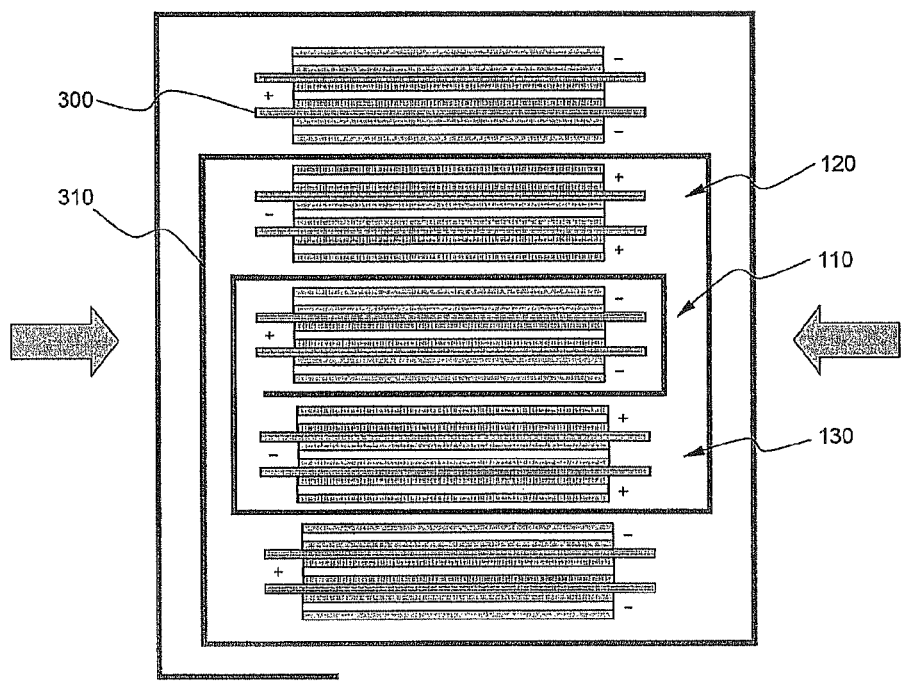
FIGS. 6 and 7 are typical views respectively illustrating electrochemical cells manufactured by folding the bicells shown in FIGS. 2 and 3, as unit cells, according to a preferred embodiment of the present invention and securing a separation film to opposite sides of the unit cells by thermal welding.
Figure 7:
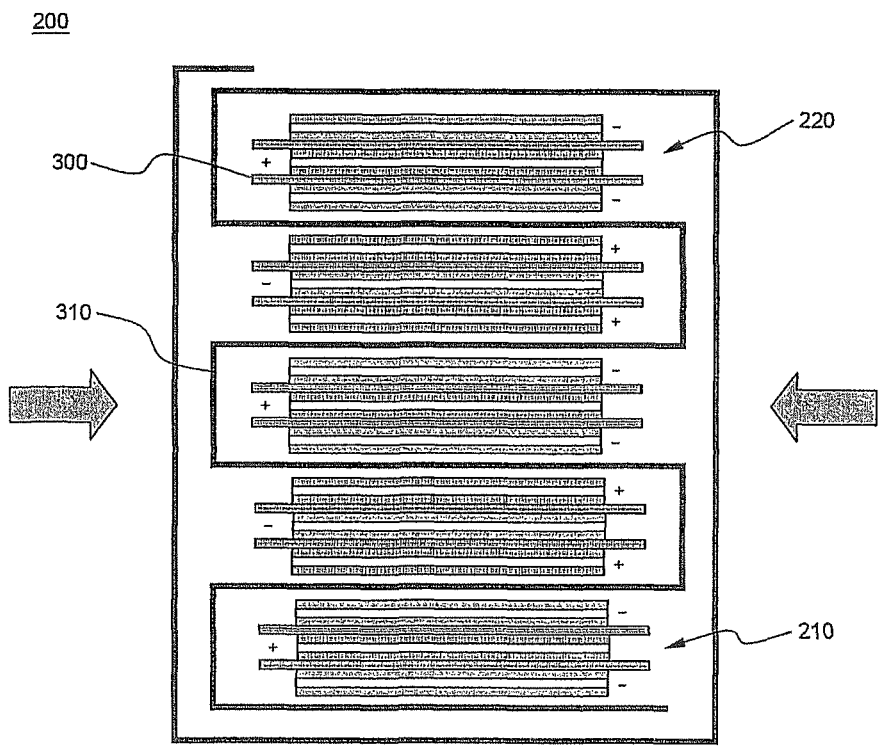

FIGS. 6 and 7 are typical views respectively illustrating electrochemical cells manufactured by folding the bicells shown in FIGS. 2 and 3, as unit cells, according to a preferred embodiment of the present invention and securing a separation film to opposite sides of the unit cells by thermal welding.

Referring to these drawings, an electrochemical cell 100; 200 is constructed in a structure in which a plurality of bicells 110, 120, 130 . . . ; 210 . . . 220 are folded by a separation film 310 formed in the shape of a long sheet, and separators 300 of the bicells 110, 120, 130 . . . ; 210 . . . 220 are secured to the separation film 310 at opposite sides thereof by thermal welding.

As shown in FIG. 6, the electrochemical cell 100 may be manufactured by folding the bicells 110, 120, 130 . . . in a structure in which the separation film 310 wraps the outer surface of the first central bicell 110 by a turn, and the separation film 310 wraps the outer surfaces of the second bicell 120 and the third bicells 130 by a turn while the second bicell 120 and the third bicells 130 are positioned above and below the first bicell 110, respectively. As shown in FIG. 7, on the other hand, the electrochemical cell 200 may be manufactured by folding the bicells 210 . . . 220 in a structure in which the separation film 310 wraps the bicells 210 . . . 220 from the lowermost bicell 210 to the uppermost bicell 220 in a zigzag fashion.

When the bicells 110, 120, 130 . . . are folded by the former method, the thickness of the separation film 310 wrapping the opposite sides of the bicells is increased toward the central bicell 110 from the outermost bicells. Consequently, the width of the bicell 110 may be decreased in consideration of the increase in thickness of the separation film.

Figure 8:
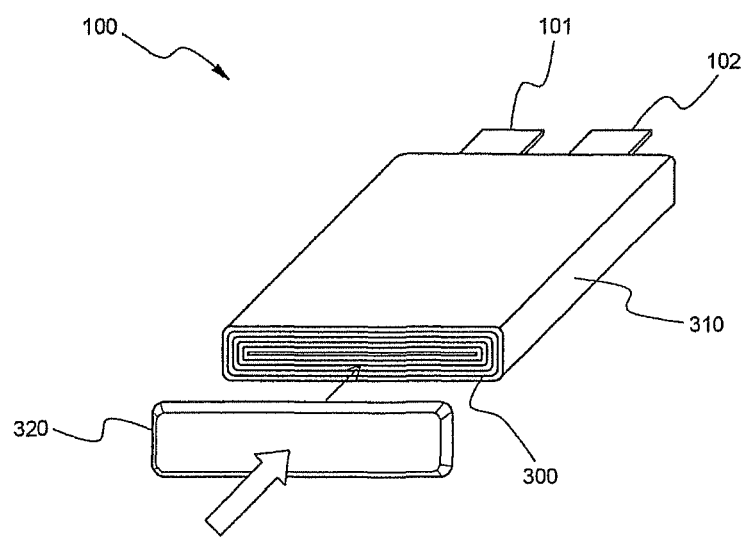
FIG. 8 is a typical view illustrating an electrochemical cell manufactured by securing a separation film to lower ends of unit cells folded according to another preferred embodiment of the present invention.

FIG. 8 is a typical view illustrating an electrochemical cell manufactured by securing a separation film to lower ends of unit cells folded according to another preferred embodiment of the present invention.

Referring to FIG. 8, an electrochemical cell 100 is provided at the upper end thereof with electrode terminals, which protrude outward from the upper end of the electrochemical cell 110. To the lower end of the cell 100 is secured an additional separator 320 having a size slightly greater than the area of the lower end of the cell 100 by thermal welding. The separator 320 is securely fixed to the lower end of the separation film 310 by the thermal welding. Also, some of the separator 320 is secured to separators 300 disposed between anodes and cathodes of the unit cells.

Hereinafter, examples of the present invention will be described in more detail. It should be noted, however, that the scope of the present invention is not limited by the illustrated examples.

Example 1

A cathode mixture slurry was prepared by adding 95 weight percent of $LiCoO_2$ as a cathode active material, 2.5 weight percent of Super-P (a conducting agent), and 2.5 weight percent of PVdf (a coupling agent) to N-methyl-2-pyrrolidone (NMP) as a solvent. An anode mixture slurry was prepared by adding 95 weight percent of artificial graphite as an anode active material, 2.5 weight percent of Super-P (a conducting agent), and 2.5 weight percent of PVdf (a coupling agent) to NMP as a solvent. The cathode mixture slurry and the anode mixture slurry were coated on an aluminum foil and a copper foil, respectively. Subsequently, the aluminum foil and the copper foil were dried and pressed. In this way, cathodes and anodes were manufactured.

Cell Guard™ was used as separators. The cathodes, the anodes, and the separators were sequentially stacked one on another to construct bicells. The same material as the separators, i.e., Cell Guard™, was also used as a separation film. A total of 7 bicells were sequentially folded using the separation film, and then the separators were thermally welded to the separation film at opposite sides thereof using a hot plate having a temperature of 100° C. In this way, an electrochemical cell was manufactured. The manufactured electrochemical cell was mounted in a pouch-shaped battery case, and then an electrolyte was injected into the battery case, whereby a battery was finally completed.

Example 2

A battery was completed in the same manner as Example 1 except that the separators were thermally welded to the separation film at the lower ends of the bicells.

Comparative Example 1

A battery was completed in the same manner as Example 1 except that the opposite sides of the bicells were not thermally welded.

Experimental Example 1

The batteries manufactured according to the Examples and the Comparative Examples were charged to 4.2 V, and then the batteries were dropped from the height of 1 m.

The dropping experiments were carried out 50 times in succession. The results of the dropping experiments are indicated in Table 1 below.

TABLE 1

|  | Number of batteries | Number of batteries short-circuited during 50 continuous dropping experiments |
|---|---|---|
| Example 1 | 100 | 2 |
| Example 2 | 100 | 10 |
| Comparative Example 1 | 100 | 85 |

It can be seen from Table 1 that the occurrence of short circuits was considerably reduced even after the 50 continuous dropping experiments were carried out for the batteries including electrochemical cells constructed in a structure in which a plurality of unit cells are folded by a separation film formed in the shape of a long sheet, and separators of the unit cells are secured to the separation film by thermal welding.

INDUSTRIAL APPLICABILITY

As apparent from the above description, the electrochemical cell according to the present invention has the effect of preventing the electrodes of the stacked electrodes from being separated from the separation film or from being twisted due to external impacts and vibrations, thereby restraining the electrochemical cell from generating heat or catching fire. Furthermore, the structural stability of the electrochemical cell is maintained even when the temperature of the electrochemical cell is increased, or the volume of the electrochemical cell is increased due to the generation of gas.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed:

1. A multi-layered type electrochemical cell comprising:
   a plurality of unit cells, each of the plurality of units cells including a full cell or a bicell, and including one or more separators;
   a separation film;
   a first thermal weld on a first side of each of the plurality of unit cells for coupling the one or more separators and the separation film;
   a second thermal weld on a second side of each of the plurality of unit cells for coupling the one or more separators and the separation film, the second side being opposite the first side.

2. The electrochemical cell according to claim 1, wherein the electrochemical cell is constructed in a structure in which the separation film has a unit length sufficient to wrap the plurality of unit cells, and the separation film is bent inward every unit length, whereby the separation film continuously wraps the plurality of unit cells from a central unit cell to an outermost unit cells.

3. The electrochemical cell according to claim 1, wherein the electrochemical cell is constructed in a structure in which the separation film has a unit length sufficient to wrap the plurality of unit cells, and the separation film is bent outward every unit length, whereby the separation film continuously wraps the plurality of unit cells from a lowermost unit cell to an upper most unit cell in a zigzag fashion, and the remainder of the separation film wraps an outer circumference of the plurality of unit cells.

4. The electrochemical cell according to claim 1, wherein the first side is a lower end of each of the plurality of unit cells and the second end is an upper end of each of the plurality of unit cells.

5. The electrochemical cell according to claim 4, wherein a first additional separator having a size sufficient to completely cover the lower end of each of the plurality of unit cells is attached thereto, and the thermal welding is performed at the lower end of each of the plurality of unit cells.

6. The electrochemical cell according to claim 4, wherein a second additional separator having a size sufficient to completely cover the upper end of each of the plurality of unit cells is attached thereto, and the thermal welding is performed at the upper end of each of the plurality of unit cells.

7. The electrochemical cell according to claim 4, wherein a first additional separator having a size sufficient to completely cover the lower end of each of the plurality of unit cells is attached thereto, and a second additional separator having a size sufficient to completely cover the upper end of each of the plurality of unit cells is attached thereto, and the thermal welding is performed at the lower end and the upper end of each of the plurality of unit cells.

8. The electrochemical cell according to claim 1, wherein the thermal welding is performed at a temperature of about 70 to about 140 degrees Celsius.

9. The electrochemical cell according to claim 1, wherein the separation film contacts each of the plurality of unit cells.

10. The electrochemical cell according to claim 1, wherein the separation film contacts at least two of the plurality of unit cells.

11. The electrochemical cell according to claim 1, wherein the separation film continuously wraps the plurality of unit cells from a central unit cell to an outermost unit cells.

12. The electrochemical cell according to claim 1, wherein the separation film wraps an outer circumference of the plurality of unit cells.

13. A lithium secondary battery comprising the electrochemical cell according to claim 1.

* * * * *